(12) United States Patent
Nielsen et al.

(10) Patent No.: US 11,473,559 B2
(45) Date of Patent: Oct. 18, 2022

(54) HINGED WIND TURBINE BLADE DEFINING AN ANGLE IN A FLAP-WISE DIRECTION

(71) Applicant: Vestas Wind Systems A/S, Aarhus N. (DK)

(72) Inventors: Thomas S. Bjertrup Nielsen, Randers Sv (DK); Peter Bjørn Andersen, Skanderborg (DK); Torben Juul Larsen, Roskilde (DK); Mikkel Kiilerich Østerlund, Aarhus C (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/271,337

(22) PCT Filed: Sep. 13, 2019

(86) PCT No.: PCT/DK2019/050270
§ 371 (c)(1),
(2) Date: Feb. 25, 2021

(87) PCT Pub. No.: WO2020/052726
PCT Pub. Date: Mar. 19, 2020

(65) Prior Publication Data
US 2021/0340954 A1 Nov. 4, 2021

(30) Foreign Application Priority Data
Sep. 13, 2018 (DK) .......................... PA 2018 70592

(51) Int. Cl.
*F03D 7/02* (2006.01)
*F03D 1/06* (2006.01)

(52) U.S. Cl.
CPC ......... *F03D 7/0236* (2013.01); *F03D 1/0675* (2013.01); *F05B 2240/2022* (2013.01); *F05B 2240/2023* (2013.01)

(58) Field of Classification Search
CPC .... F03D 1/0658; F03D 1/0666; F03D 1/0675; F03D 7/0236; F05B 2240/202; F05B 2240/2022; F05B 2240/2023
See application file for complete search history.

(56) References Cited

U.S. PATENT DOCUMENTS 4,197,056 A * 4/1980 Hutter ................... F03D 1/0608
416/142
4,353,681 A * 10/1982 Doman ..................... F03D 1/00
416/11

(Continued)

FOREIGN PATENT DOCUMENTS

NL          1002324 C1    8/1997
SE          404716 B      10/1978

(Continued)

OTHER PUBLICATIONS

Danish Patent and Trademark Office, Search and Examination Report in PA 2018 70592, dated Mar. 13, 2019.

(Continued)

*Primary Examiner* — J. Todd Newton
*Assistant Examiner* — Brian O Peters
(74) *Attorney, Agent, or Firm* — Wood Herron & Evans LLP

(57) ABSTRACT

A horizontal axis wind turbine (1) with a wind turbine blade (5) is disclosed, the wind turbine blade (5) comprising a hinge (6) arranged to connect the wind turbine blade (5) to a blade carrying structure (4) of the wind turbine (1), at a non-zero distance from an inner tip (5a) and at a non-zero distance from an outer tip (5b) of the wind turbine blade (5). An outer blade part (7) is arranged between the hinge region and the outer tip (5b), and an inner blade part (8) is arranged between the hinge region and the inner tip (5a). The outer blade part (7) extends from the hinge region along a first direction and the inner blade part (8) extends from the hinge (Continued)

region along a second direction, and the first direction and the second direction form an angle, α, there between, where $0°<α<90°$.

16 Claims, 15 Drawing Sheets

(56) References Cited

U.S. PATENT DOCUMENTS

| | | | | |
|---|---|---|---|---|
| 4,533,297 A | * | 8/1985 | Bassett | F03D 1/0658 |
| | | | | 416/11 |
| 4,632,637 A | | 12/1986 | Traudt | |
| 5,219,454 A | * | 6/1993 | Class | F16F 15/322 |
| | | | | 73/458 |
| 6,069,409 A | | 5/2000 | Fowler et al. | |
| 2010/0068058 A1 | | 3/2010 | Sorensen | |
| 2010/0104444 A1 | * | 4/2010 | Garcia | F03D 1/0633 |
| | | | | 416/223 R |

FOREIGN PATENT DOCUMENTS

| | | |
|---|---|---|
| WO | 2008002149 A1 | 1/2008 |
| WO | 2015123738 A1 | 8/2015 |

OTHER PUBLICATIONS

European Patent Office, International Search Report and Written Opinion in PCT Application No. PCT/DK2019/050270, dated Dec. 12, 2019.

\* cited by examiner

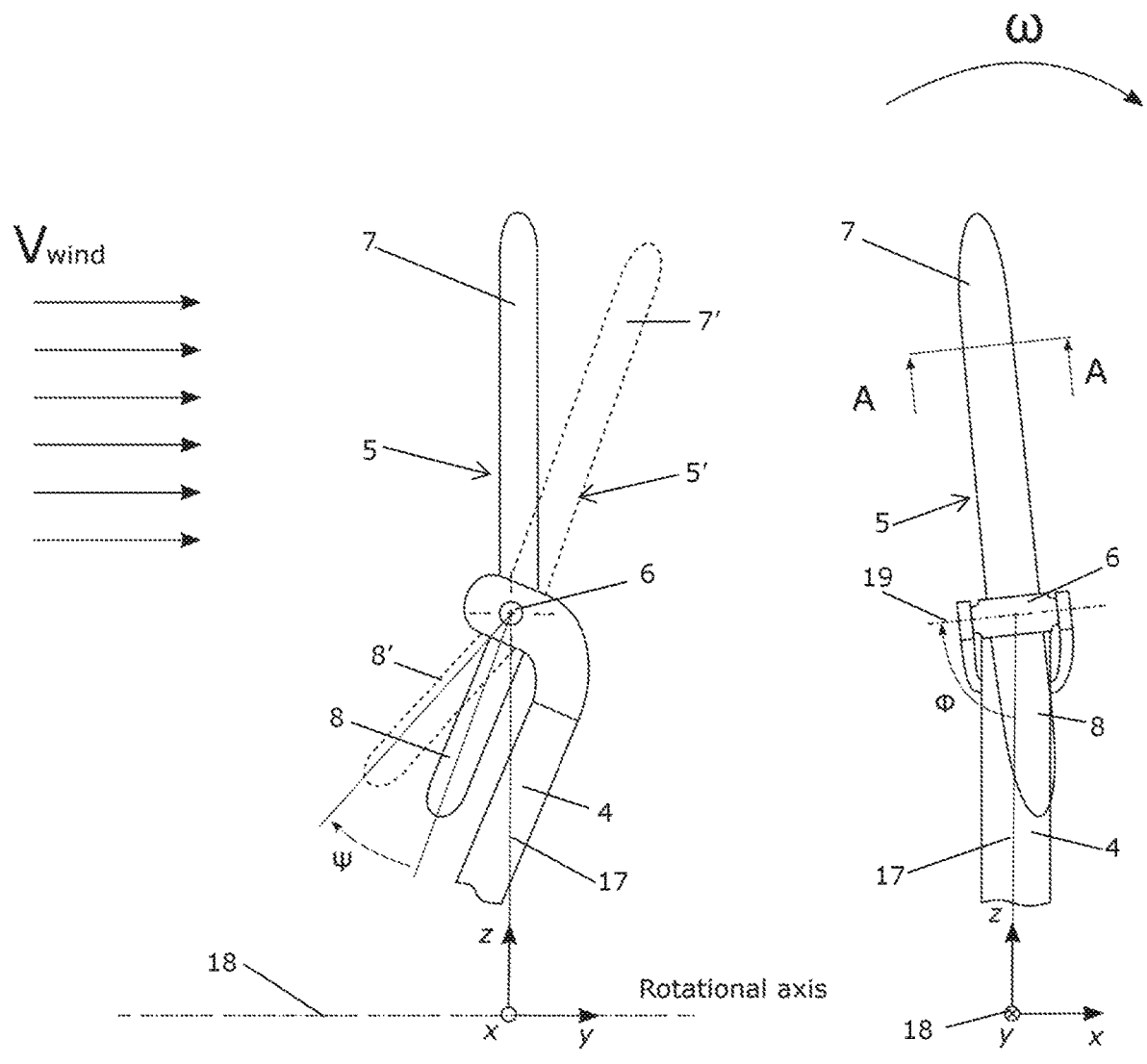
Fig. 16a
Fig. 16b
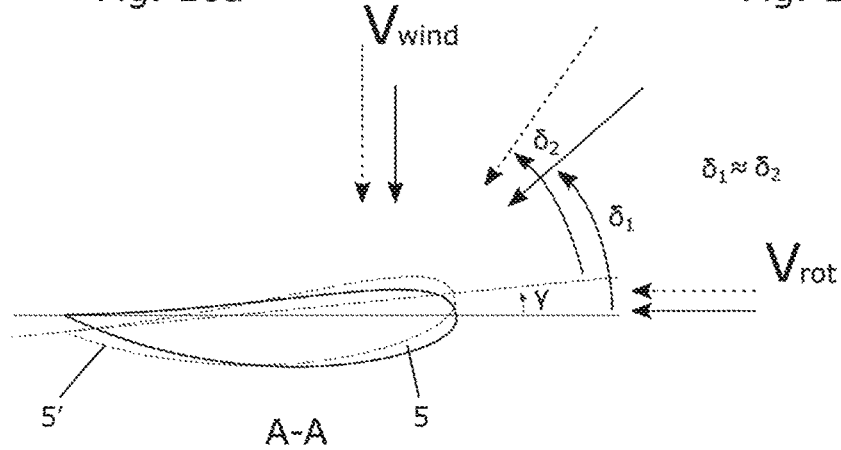
Fig. 16c

HINGED WIND TURBINE BLADE DEFINING AN ANGLE IN A FLAP-WISE DIRECTION

FIELD OF THE INVENTION

The present invention relates to a horizontal axis wind turbine with a wind turbine blade being connected to a blade carrying structure of a wind turbine via a hinge. The wind turbine blade according to the invention reduces the loads on the wind turbine, in particular loads on the wind turbine blades, the hub, the drive train and the tower of the wind turbine, and improves the energy conversion of the wind turbine.

BACKGROUND OF THE INVENTION

Wind turbines are normally controlled in order to provide a desired power output and in order to control loads on the wind turbine. For horizontal axis wind turbines, i.e. wind turbines with a rotor which rotates about a substantially horizontal rotational axis, this may be obtained by controlling a pitch angle of the wind turbine blades. In this case the angle of attack of the wind turbine blades relative to the incoming wind is adjusted by rotating the wind turbine blades about a longitudinal axis.

As an alternative, wind turbines may be provided with wind turbine blades which are connected to a blade carrying structure via hinges, thereby allowing a pivot angle defined between the wind turbine blades and the blade carrying structure to be varied. In such wind turbines the diameter of the rotor of the wind turbine, and thereby the area swept by the rotor, is varied when the pivot angle is varied.

In order to allow the wind turbine blades to pivot as described above, the wind turbine blades must be mounted on the hub in such a manner that at least part of the wind turbine blades are arranged at a distance from the tower along a horizontal direction. This will allow an inner portion of the wind turbine blades to pass the tower and the nacelle without risking collisions there between. However, it also results in a centre of mass of the wind turbine blades being positioned at a distance from the tower along the horizontal direction, and this introduces uneven loads on the wind turbine, in particular on the hub, the drive train and the tower. Furthermore, the centre of mass will move further away from the tower as the wind turbine blades pivot towards larger pivot angles. In order to limit this effect, there is a limit to the length of the wind turbine blades, and thereby to the maximum obtainable rotor diameter of the wind turbine.

U.S. Pat. No. 4,632,637 discloses a high speed, downwind horizontal axis wind turbine having three circumferentially spaced lightweight blades having inner support arms radially outwardly disposed blade segments which are pivotally connected to the support arms, so as to fold straight downwind under high wind conditions or high rotating speeds.

DESCRIPTION OF THE INVENTION

It is an object of embodiments of the invention to provide a wind turbine with hinged wind turbine blades, in which loads on the wind turbine are reduced without reducing the power production.

It is a further object of embodiments of the invention to provide a wind turbine with hinged wind turbine blades, in which the maximum rotor diameter is increased without increasing loads on the wind turbine.

The invention provides a wind turbine blade defining an aerodynamic profile between an inner tip and an outer tip, the wind turbine blade comprising:
 a hinge arranged to connect the wind turbine blade to a blade carrying structure of a wind turbine, in a hinge region of the wind turbine blade, the hinge region being arranged at a distance from the inner tip and at a distance from the outer tip,
 an outer blade part arranged between the hinge region and the outer tip, and
 an inner blade part arranged between the hinge region and the inner tip,
wherein the outer blade part extends from the hinge region along a first direction and the inner blade part extends from the hinge region along a second direction, and wherein the first direction and the second direction form an angle, $\alpha$, there between, where $0° < \alpha < 90°$.

The invention further provides a horizontal axis wind turbine comprising a tower, a nacelle mounted on the tower via a yaw system, a hub mounted rotatably on the nacelle, the hub comprising a blade carrying structure, and at least one wind turbine blade defining an aerodynamic profile between an inner tip and an outer tip, the wind turbine blade comprising:
 a hinge connecting the wind turbine blade to the blade carrying structure, in a hinge region of the wind turbine blade, the hinge region being arranged at a non-zero distance from the inner tip and at a non-zero distance from the outer tip, the wind turbine blade thereby being arranged to perform pivot movements relative to the blade carrying structure between a minimum pivot angle and a maximum pivot angle,
 an outer blade part arranged between the hinge region and the outer tip, and
 an inner blade part arranged between the hinge region and the inner tip,
wherein the outer blade part extends from the hinge region along a first direction and the inner blade part extends from the hinge region along a second direction, and wherein the first direction and the second direction form an angle, $\alpha$, there between, where $0° < \alpha < 90°$.

Thus, the invention relates to a horizontal axis wind turbine with at least one wind turbine blade. The wind turbine blade defines an aerodynamic profile between an inner tip and an outer tip. The aerodynamic profile of the wind turbine blade ensures that the wind turbine blade is capable of extracting energy from the wind.

In the present context the term 'inner tip' should be interpreted to mean an extremity of the wind turbine blade which is arranged closest to a hub of a wind turbine having the wind turbine blade mounted thereon. Similarly, in the present context the term 'outer tip' should be interpreted to mean an extremity of the wind turbine blade which is arranged furthest away from the hub.

The wind turbine blade comprises a hinge, an outer blade part and an inner blade part. The hinge is arranged to connect the wind turbine blade to a blade carrying structure of the wind turbine. Thereby the wind turbine blade is arranged to perform pivot movements relative to the blade carrying structure, via the hinge. A pivot angle is thereby defined between the wind turbine blade and the blade carrying structure, depending on the position of the hinge and thereby of the wind turbine blade relative to the blade carrying structure. Accordingly, the pivot angle defines the direction along which a given wind turbine blade extends relative the blade carrying structure, and thereby relative to the hub.

This, in turn, determines a diameter of the rotor, and thereby the ability of the wind turbine to extract energy from the wind.

The hinge may be or comprise a bearing, e.g. in the form of a journal bearing, a roller bearing, or any other suitable kind of bearing.

The pivot angle can vary between a minimum pivot angle, defining a maximum rotor diameter or a rotor diameter close to maximum rotor diameter, and a maximum pivot angle, defining a minimum rotor diameter.

The hinge is arranged in a hinge region of the wind turbine blade. Thus, the hinge region defines a part of the wind turbine blade at and around the position where the hinge is arranged. The hinge region is arranged at a non-zero distance from the inner tip and at a non-zero distance from the outer tip.

Accordingly, the hinge region, and thereby the hinge, is not arranged at an end of the wind turbine blade.

The outer blade part is arranged between the hinge region and the outer tip. Accordingly, the outer blade part includes the outer tip and is arranged outwards relative to the hinge region.

Similarly, the inner blade part is arranged between the hinge region and the inner tip. Accordingly, the inner blade part includes the inner tip and is arranged inwards relative to the hinge region.

The outer blade part extends from the hinge region along a first direction and the inner blade part extends from the hinge region along a second direction. The first direction and the second direction form an angle, $\alpha$, there between, where $0°<\alpha<90°$. Accordingly, a bend is defined along the length of the wind turbine blade, more particularly in the hinge region. The bend may be defined exactly at the hinge position, i.e. exactly where the wind turbine blade is hinged to the blade carrying structure. Alternatively, the bend may merely be defined in the hinge region, i.e. at a position near the hinge.

The angle, $\alpha$, between the inner blade part and the outer blade part allows the wind turbine blade to be pivoted to a position which arranges the outer tip further away from the hub and/or further away from the position of the hinge along a horizontal direction, than is the case for wind turbine blades without an angle between the inner blade part and the outer blade part. Thereby the rotor diameter is increased in the position defining minimum pivot angle, and thereby maximum rotor diameter. Furthermore it allows the outer blade part to be pre-coned towards the wind even though the blade carrying structure is pre-coned downwind. Accordingly, the maximum obtainable rotor diameter, and thereby the power production of the wind turbine, is increased, in particular at low wind speeds.

Furthermore, the angle, $\alpha$, allows the attachment point between the wind turbine blades and the blade carrying structure to be moved closer to the tower without risking collisions between the wind turbine blades and the tower at large pivot angles, because the inner tip is arranged further away from the tower at large pivot angles, thereby ensuring the required clearance, without introducing coning, or with a reduced coning angle. Thereby the centre of mass of the wind turbine blades can be moved closer to the tower, thereby reducing the loads on the wind turbine, in particular on the hub, the drive train and the tower. Furthermore, this position of the centre of mass of the wind turbine blade reduces an inertia of the rotor when the wind turbine blade is in a position defining minimum pivot angle, which will normally be the case at low wind speeds. This low inertia can easily be overcome by wind acting on the wind turbine blades, and thereby it is easy to start the wind turbine at cut-in wind speed. At low rotational speeds, high losses are introduced in the drive train. The easy start of the wind turbine allows the rotor to move quickly out of the rotational speed region where high losses are introduced, and thereby the overall power production of the wind turbine at low wind speeds can be improved.

The wind turbine according to the invention is a horizontal axis wind turbine. Accordingly, the rotational axis of the hub is arranged along a substantially horizontal direction, contrary to vertical axis wind turbines in which the rotational axis of the hub is arranged along a substantially vertical direction.

The angle, $\alpha$, may be in a flap-wise direction. According to this embodiment, the angle, $\alpha$, may be arranged about a pivot axis defined by the hinge.

The wind turbine blades may have a centre of mass for the wind turbine blade at rest which is positioned between the hinge and the inner tip of the wind turbine blade, i.e. in the inner blade part. In this case, the centre of mass for the wind turbine blade is arranged in a part of the wind turbine blade which is arranged closer to the hub than the hinge. When the hub rotates relative to the nacelle, a centrifugal force acts on the wind turbine blade, at the position of the centre of mass. Thereby the centrifugal force will tend to push the part of the wind turbine blade arranged between the hinge and the inner tip, i.e. the part of the wind turbine blade where the centre of mass is arranged, in an outwards direction. This will cause the wind turbine blade to pivot via the hinges in such a manner that the wind turbine blades are rotated towards a position where the longitudinal direction of the wind turbine blade is arranged substantially parallel to the rotational axis of the hub. Thereby the wind turbine blade is pivoted in such a manner that the pivot angle is increased and the diameter of the rotor is reduced. The higher the rotational speed, the further the wind turbine blade will be pivoted towards this position.

Thus, according to this embodiment, the diameter of the rotor is automatically reduced as the rotational speed of the hub increases. Accordingly, the rotor diameter, and thereby the ability of the wind turbine to extract energy from the wind, is automatically adjusted according to the prevailing wind speed, without requiring complicated control algorithms or maintenance requiring mechanical parts, such as pitch mechanisms, etc.

Alternatively or additionally, aerodynamic forces acting on the aerodynamic profiles of the wind turbine blades may cause the wind turbine blade to pivot in such a manner that the diameter of the rotor is reduced as the wind speed increases. In a preferred embodiment, the centrifugal force and the aerodynamic forces cooperate in reducing the rotor diameter as the wind speed increases, i.e. they are not counteracting each other. This could, e.g., be obtained when the centre of mass of the wind turbine blade is arranged in the inner blade part, as described above. For some wind turbines, e.g. small wind turbines, the centrifugal force may be the dominating factor with respect to ensuring that the wind turbine blade is pivoted towards smaller rotor diameter. For other wind turbines, e.g. larger wind turbines, the aerodynamic forces may be the dominating factor.

In other embodiments, the centre of mass of the wind turbine blade may be arranged at the hinge position or in the outer blade part. This results in either neutral centrifugal forces or centrifugal forces acting towards moving the wind turbine blade towards a position defining a minimum pivot angle as the rotational speed increases.

The outer blade part and the inner blade part may be two separate parts being joined to each other. According to this embodiment, the wind turbine blade is segmented in the sense that it is made from separate parts which are joined to each other to form the wind turbine blade. This makes it easier to transport the wind turbine blade, since the parts of the wind turbine blade can be transported separately, and the wind turbine blade can be assembled at the site of the wind turbine. The hinge region may form part of the outer blade part or the inner blade part, or it may be formed from a portion of the outer blade part and a portion of the inner blade part. As an alternative, the hinge region may form part of a separate blade part being joined to the outer blade part as well as to the inner blade part.

Thus, the wind turbine blade may further comprise a hinge part interconnecting the inner blade part and the outer blade part. According to this embodiment, the hinge part may form the hinge region, or the hinge region may be a portion of the hinge part, or the hinge region may be formed from (a portion of) the hinge part and a portion of the outer blade part and/or the inner blade part. In any event, the hinge is positioned on the hinge part. Furthermore, according to this embodiment, the hinge is mounted on a separate part of the wind turbine blade, and the hinge part can be designed to meet requirements at the hinge position, e.g. with respect to strength and material thickness, without having to consider other requirements which may be relevant for other parts of the wind turbine blade, e.g. with respect to weight, aerodynamic properties, flexibility, etc.

Alternatively, the outer blade part and the inner blade part may form one piece.

The angle, $\alpha$, may be within a range of 5° to 45°, such as between 10° and 40°, such as between 15° and 35°, such as between 20° and 30°, such as approximately 25°.

The optimal angle, $\alpha$, depends on the rated rotor speed of the wind turbine. For example, for a 2.2 MW wind turbine with a maximum rotor diameter of 234 m, a relative low rotor speed, such as approximately 8 rpm, applies. In this case the optimum angle, $\alpha$, is approximately 25°. The optimum angle, $\alpha$, decreases with increased rated rotor speed, and thereby decreases with maximum rotor diameter. Accordingly, for a very small wind turbine with a maximum rotor diameter of 10 m and a rated rotor speed of approximately 300 rpm, the optimum angle, $\alpha$, is only a few degrees, i.e. 1°-4°. The optimum angle, $\alpha$, for wind turbine sizes in-between the ones described above is thereby within the interval 4°-25°. For even larger wind turbines the optimum angle, $\alpha$, is above 25°, such as up to 40° or more.

The optimum value for the angle, $\alpha$, is found based on requirements to rotor inertia and centrifugal forces compared to aerodynamic forces. Also, the optimum angle, $\alpha$, may be based on requirements to a relatively high rotor speed at low wind speeds, since this results in less generator losses.

The inner blade part and/or the outer blade part may be curved in a flap-wise direction. According to this embodiment, at least a part of the inner blade part and/or at least a part of the outer blade part follows a curved path in the flap-wise direction, rather than following a straight line. This may increase or decrease the angle between the outer blade part and the inner blade part as a function of position along the length of the wind turbine blade. This may increase the maximum rotor diameter and/or improve tower clearance further. The curve may be along the entire inner blade part or outer blade part, or it could be only along a part of the inner blade part or outer blade part, such as in a region near the inner tip or the outer tip.

The inner blade part may be curved in the flap-wise direction, while the outer blade part follows a straight line in the flap-wise direction, or vice versa. Alternatively, the inner blade part as well as the outer blade part may be curved in the flap-wise direction. Each of the inner blade part and the outer blade part may be curved in an outwards direction, i.e. away from the hub, or in an inwards direction, i.e. towards the hub. In the case that the inner blade part as well as the outer blade part is curved in the flap-wise direction, they may be curved in the same direction, i.e. both curved in an outwards direction or in an inwards direction, or they may be curved in opposite directions, i.e. one of the blade parts being curved in an outwards direction and the other being curved in an inwards direction.

According to a preferred embodiment, the outer blade part is curved flap-wise in an outwards direction, while the inner blade part follows a straight line. This design of the wind turbine blade reduces a rotor inertia during idling, thereby allowing the wind turbine to easier cut-in at low wind speeds, as described above. Furthermore, an even larger maximum rotor diameter is obtained, resulting in increased power production at minimum pivot angle and low wind speeds.

Alternatively or additionally, the inner blade part and/or the outer blade part may be curved in an edge-wise direction. According to this embodiment, at least a part of the inner blade part and/or at least a part of the outer blade part follows a curved path in the edge-wise direction, rather than following a straight line. In the present context the term 'edge-wise direction' should be interpreted to mean a direction being along with or opposite to the movement of the wind turbine blade as it rotates along with the hub of the wind turbine. Thus, according to this embodiment the inner blade part and/or the outer blade part is curved towards the leading edge or towards the trailing edge.

Curving a wind turbine blade in the edge-wise direction is sometimes referred to as 'sweep'. When a wind turbine blade provided with sweep passes the tower of a wind turbine, the tower is passed gradually, since the sweep ensures that only a portion of the wind turbine blade is arranged adjacent to the tower at any given time. This reduces the loads on the wind turbine during tower passage, in particular loads on the wind turbine blade and on the tower.

Furthermore, sweep allows the wind turbine blade to perform torsional twists during a full rotation of the rotor. This levels out wobbles in suction acting on the wind turbine blade, thereby reducing loads on the wind turbine blade.

Finally, sweep results in local twist of the wind turbine blade which rotates the wind turbine blade towards a lower angle of attack in response to increased flap-wise loads. This also reduces loads on the wind turbine blade.

The inner blade part may be curved in the edge-wise direction, while the outer blade part follows a straight line in the edge-wise direction, or vice versa. Alternatively, the inner blade part as well as the outer blade part may be curved in the edge-wise direction. Each of the inner blade part and the outer blade part may be curved in a direction towards the leading edge or in a direction towards the trailing edge. In the case that the inner blade part as well as the outer blade part is curved in the edge-wise direction, they may be curved in the same direction, i.e. both curved in a direction towards the leading edge or in a direction towards the trailing edge, or they may be curved in opposite directions, i.e. one of the blade parts being curved in a direction towards the leading edge and the other being curved in a direction towards the trailing edge.

The wind turbine blade may comprise a plurality of fibres arranged in parallel along the wind turbine blade, and the wind turbine blade may comprise a region in which an orientation of the fibres deviates from a main orientation of the fibres being substantially parallel to a leading edge or a trailing edge of the wind turbine blade.

Wind turbine blades are often manufactured from fibre glass comprising fibres and resin. The fibres may be arranged in parallel along a longitudinal direction of the wind turbine blade, and this direction determines how the wind turbine blade reacts to loads, in particular flap-wise loads, applied to the wind turbine blade by the wind, in particular with respect to deflection and twisting of the wind turbine blade. However, according to this embodiment, the fibres are arranged along a different direction in a region of the wind turbine blade, i.e. the fibres are, in this region, arranged 'off axis'. This has the consequence that this region of the wind turbine blade reacts differently to deflections in a flap-wise direction than the remaining part of the wind turbine blade. This causes the wind turbine blade to twist, resulting in the wind turbine blade being rotated towards a lower angle of attack in response to increased flap-wise loads. This also reduces loads on the wind turbine blade. In traditional pitch controlled wind turbines, this twisting behaviour is undesirable, because it introduces torsional loads on the pitch mechanism. However, for a wind turbine with hinged blades this is not an issue, since the wind turbine blades are not connected to the hub via a pitch system.

The inner blade part may be provided with a balancing mass. The balancing mass may be positioned anywhere along the inner blade part, such as near the hinge region, near the inner tip, or there between. Applying a balancing mass in this manner moves a centre of mass of the wind turbine blade at rest in a direction towards the inner tip, as compared to an identical wind turbine blade without a balancing mass. Thereby, by selecting and positioning the balancing mass in an appropriate manner, the position of the centre of mass for the wind turbine blade at rest can be positioned at any desired position. For instance, the centre of mass for the wind turbine blade at rest may be positioned between the hinge and the inner tip of the wind turbine blade, thereby ensuring that the wind turbine blade is automatically pivoted towards larger pivot angles as the rotational speed increases, due to the centrifugal force, as described above.

Furthermore, by placing the balancing mass at the inner blade part close to the inner tip, and therefore having the centre of mass in the part of the wind turbine blade arranged closer to the hub than the hinge, improves the lift on the wind turbine blade.

The inner blade part and/or the outer blade part may be provided with a winglet. According to this embodiment, a winglet may be arranged at or near the inner tip and/or at or near the outer tip of the wind turbine blade. Providing the inner blade part and/or the outer blade part with a winglet improves the efficiency of the wind turbine blade by improving the aerodynamic properties at or near the tip. The winglet(s) may have a precisely selected weight, thereby acting as a balancing mass which can be used for positioning the centre of mass of the wind turbine blade at rest at a desired position, as described above.

The wind turbine may further comprise a biasing mechanism being arranged to apply a biasing force to the wind turbine blade which biases the wind turbine blade towards a position defining a minimum pivot angle of the wind turbine blade relative to the blade carrying structure. According to this embodiment, the wind turbine blade performs the pivot movements relative to the blade carrying structure between a minimum pivot angle and a maximum pivot angle wherein the pivot movements towards a position defining the maximum pivot angle are performed against the applied biasing force.

The biasing force could, e.g., be applied by means of wires attached to the inner blade part of the wind turbine blade, which pull the wind turbine blade outwards, i.e. towards the minimum pivot angle.

As an alternative, the biasing force could be applied by means of one or more springs acting in the wind turbine blade, e.g. compressible springs arranged for pulling or pushing the wind turbine blade towards the minimum pivot angle.

As another alternative, the biasing force could be in the form of a moment. In this case the biasing force could be applied by means of a torsional spring arranged in the hinge which pulls or pushes the wind turbine blade towards the minimum pivot angle.

As another alternative, the biasing force could be applied by means of hydraulic mechanisms connected to the wind turbine blade and being arranged for pulling or pushing the wind turbine blade towards the minimum pivot angle.

The biasing mechanism may be attached to the wind turbine blade by means of a suitable connecting interface, e.g. including a hook, an eyelet or the like.

In the case that the wind turbine blade is provided with a winglet, the biasing mechanism could be connected to the winglet. This is a suitable connecting position, because a winglet is normally a strong and stable structure which is capable of handling the forces and loads applied by the biasing mechanism.

Alternatively or additionally, the wind turbine may further comprise a biasing mechanism arranged to apply a biasing force to the wind turbine blade which biases the wind turbine blade towards a position defining a maximum pivot angle relative to the blade carrying structure. This is similar to the embodiment described above. However, according to this embodiment, it is the pivot movements towards minimum pivot angle which are performed against the biasing force. Except for this, the remarks set forth above regarding how the biasing force can be applied are equally applicable here. However, the inner tip of the inner blade part may be free of mechanical connections that cause the pivot movement towards the maximum pivot angle of the wind turbine blade relative to the blade carrying structure.

The blade carrying structure may comprise one or more arms, each arm having a wind turbine blade connected thereto. According to this embodiment, the blade carrying structure is of a kind having one or more arms extending from the hub, and each carrying a wind turbine blade. The arms may extend along a radial direction relative to the hub. Thereby the position of the hinge of a given wind turbine blade, and thereby the position of the connecting point between the blade carrying structure and the wind turbine blade, is arranged at a distance from the hub along a radial direction.

Each arm may extend from the hub along a direction which forms an angle, $\beta$, relative to a vertical direction, where $0°<\beta<30°$. According to this embodiment, the arms do not extend within a vertical plane, but rather forms a cone with its apex arranged on the rotational axis of the hub. This will position the hinge of a given wind turbine blade, and thereby the position of the connecting point between the blade carrying structure and the wind turbine blade, at a distance from the hub along a horizontal direction. This distance is sometimes referred to as an overhang. The angle, β, may be referred to as a coning angle.

A rotational axis of the hinge of each wind turbine blade may be arranged relative to a line which extends between a rotational axis of the hub and a centre of the hinge, in such a manner that the rotational axis of the hinge and the line form an angle, Φ, there between which differs from 90°. The line could e.g., extend perpendicularly to the rotational axis of the hub. The angle, Φ, is preferably formed in a plane which is spanned by the line and the rotational axis of the hinge.

Since the angle, Φ, differs from 90°, the pivoting movement of a given blade is performed about a rotational axis which is not arranged perpendicular to, for instance, an arm which carries the wind turbine blade, but is rather skew with respect thereto. This has the consequence that when the wind turbine blade performs pivot movements, it is also rotated about its torsional axis. Thereby the angle of attack, and thereby the ability of the wind turbine blade to extract energy from the wind, is also changed when the pivot angle is changed. Furthermore, selecting Φ≠90° has the consequence that the torsional movement of the blade carrying structure is not directly coupled to the edge-wise movement of the wind turbine blade. This introduces a considerable amount of damping of the torsional movements in the blade carrying structure from the partly edge/flap coupled blade movements. In addition, selecting Φ≠90° has the consequence that the hinge has a direct impact on blade direction of movement during blade vibrations. Since the aeroelastic damping is sensitive to this direction of vibration relative to the incoming wind, the damping can be adjusted by the skew hinge angle and therefore be an efficient method for reducing the risk of, e.g., edgewise blade vibrations.

The angle, Φ, may advantageously be selected such that 75°<Φ<90° or 90°<Φ<105°. In the case that Φ<90°, a close to constant angle of attack can be maintained during pivoting movements. In the case that Φ>90°, it is possible to passively control at which wind speed the wind turbine blade will stall, hence moving the wind turbine blade towards maximum pivot angle.

The wind turbine may comprise only one nacelle, in which case the wind turbine is of a single rotor type. In this case the nacelle will typically be mounted on top of the tower. Alternatively, the wind turbine may comprise two or more nacelles, in which case the wind turbine is of a multirotor type. In this case at least some of the nacelles may be mounted directly on the tower and/or at least some of the nacelles may be mounted on the tower via load carrying structures, e.g. comprising arms extending in a direction away from the centre axis of the tower. Furthermore, all of the rotors may comprise hinged wind turbine blades, as described above, or some of the rotors may comprise hinged wind turbine blades, whereas one or more of the rotors may comprise conventional pitchable wind turbine blades. Each nacelle may be mounted on the tower via a separate yaw system, or two or more nacelles may be mounted on the tower via a common yaw system, in which case these nacelles are yawed together relative to the tower.

In any event, since the nacelle is mounted on the tower via a yaw system, it can rotate about a substantially vertical rotational axis, relative to the tower, in order to direct one or more rotors of the wind turbine into the incoming wind. The yaw system may be an active yaw system in which the nacelle is rotated actively by means of a yaw drive mechanism, e.g. on the basis of measurements of the wind direction. As an alternative, the yaw system may be a passive yaw system in which the nacelle automatically rotates according to the wind direction without the use of a yaw drive mechanism. As another alternative, the yaw system may be a combination of an active yaw system and a passive yaw system, in the sense that it may operate actively under some circumstances and passively under other circumstances.

The nacelle may be a traditional nacelle having an outer wall enclosing an interior of the nacelle, the nacelle housing various components of the wind turbine, such as generator, drive train, etc. As an alternative, the nacelle may simply be a structure which is capable of performing yawing movements relative to the tower. In this case some or all of the components described above may be arranged outside the nacelle, e.g. in an interior part of the tower.

A hub is mounted rotatably on the nacelle. The hub comprises a blade carrying structure having one or more wind turbine blades, as described above, connected thereto. Accordingly, the wind turbine blades rotate along with the hub and the blade carrying structure relative to the nacelle.

Accordingly, each of the wind turbine blades is arranged to perform pivot movements relative to the blade carrying structure, via the hinge. A pivot angle is thereby defined between each wind turbine blade and the blade carrying structure, depending on the position of the hinge and thereby of the wind turbine blade relative to the blade carrying structure. Furthermore, the wind turbine blades comprise an outer blade part and an inner blade part extending from a hinge region with an angle there between, as described above.

The wind turbine may be a downwind wind turbine.

BRIEF DESCRIPTION OF THE DRAWINGS

The invention will now be described in further detail with reference to the accompanying drawings in which FIGS. 16a-16c illustrate a wind turbine blade according to an alternative embodiment of the invention.

DETAILED DESCRIPTION OF THE DRAWINGS

FIGS. 1-4 illustrate a wind turbine 1 according to an embodiment of the invention.

Figure 1:
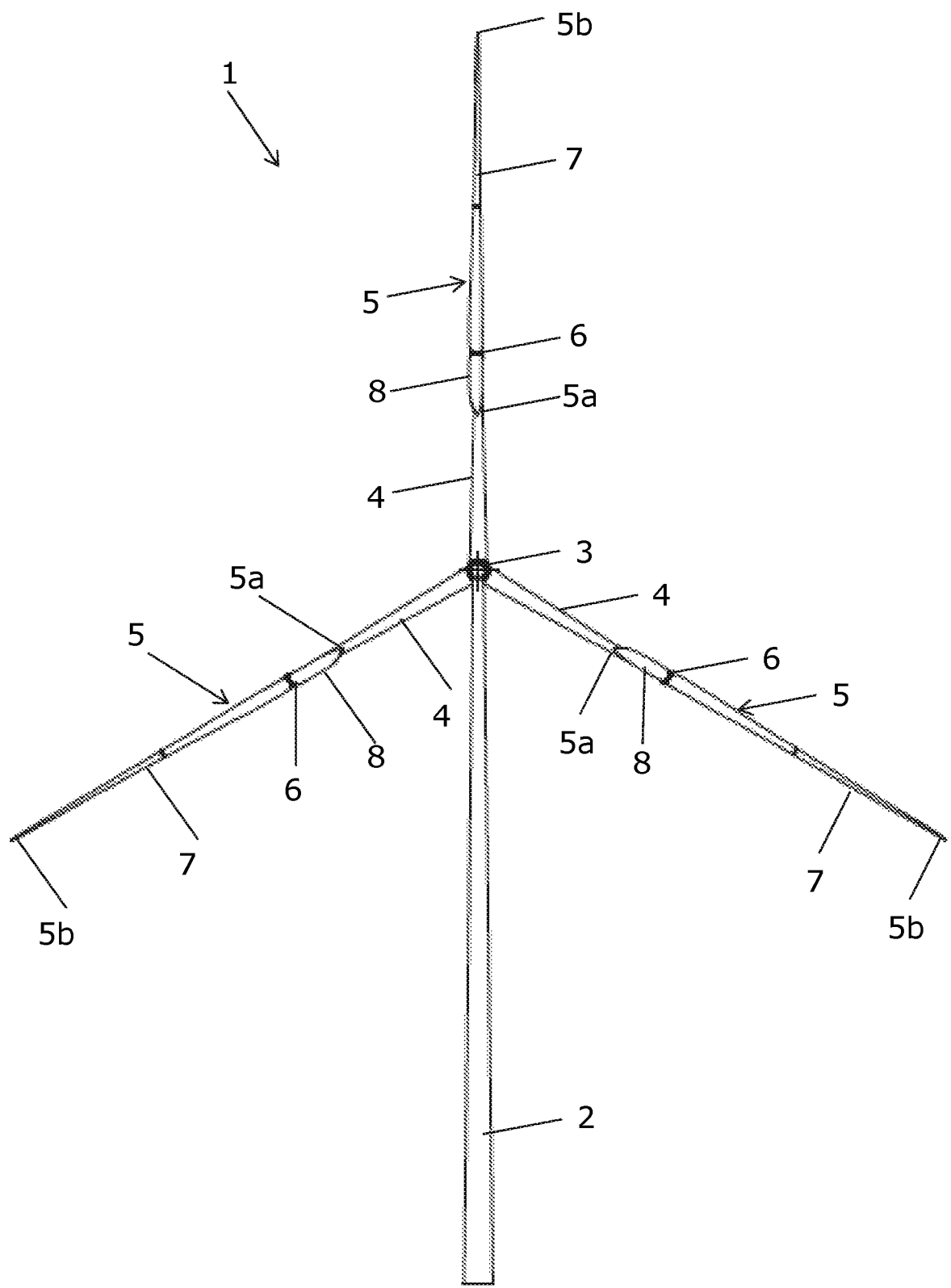
FIG. 1 is a front view of a wind turbine according to an embodiment of the invention.

FIG. 1 is a front view of the wind turbine 1. The wind turbine 1 comprises a tower 2 and a nacelle (not visible) mounted on the tower 2 via a yaw system. A hub 3 is mounted rotatably on the nacelle, the hub 3 comprising a blade carrying structure 4 with three arms. Three wind turbine blades 5 are each connected to the blade carrying structure 4 via a hinge 6 in a hinge region of the wind turbine blade 5. The wind turbine blade 5 is thereby arranged to perform pivot movements relative to the blade carrying structure 4 between a minimum pivot angle and a maximum pivot angle.

Each wind turbine blade 5 defines an aerodynamic profile between an inner tip 5a and an outer tip 5b. The hinge 6 is arranged at a non-zero distance from the inner tip 5a and at a non-zero distance from the outer tip 5b. Thereby an outer blade part 7, extending between the hinge 6 and the outer tip 5b, and an inner blade part 8, extending between the hinge 6 and the inner tip 5a, are defined.

The hinge 6 allows the wind turbine blade 5 to perform pivot movements relative to the blade carrying structure 4. A pivot angle is thereby defined between the wind turbine blade 5 and the blade carrying structure 4, depending on the position of the hinge 6 and thereby of the wind turbine blade 5 relative to the blade carrying structure 4. This determines a diameter of the rotor, and thereby the ability of the wind turbine 1 to extract energy from the wind.

Figure 2:
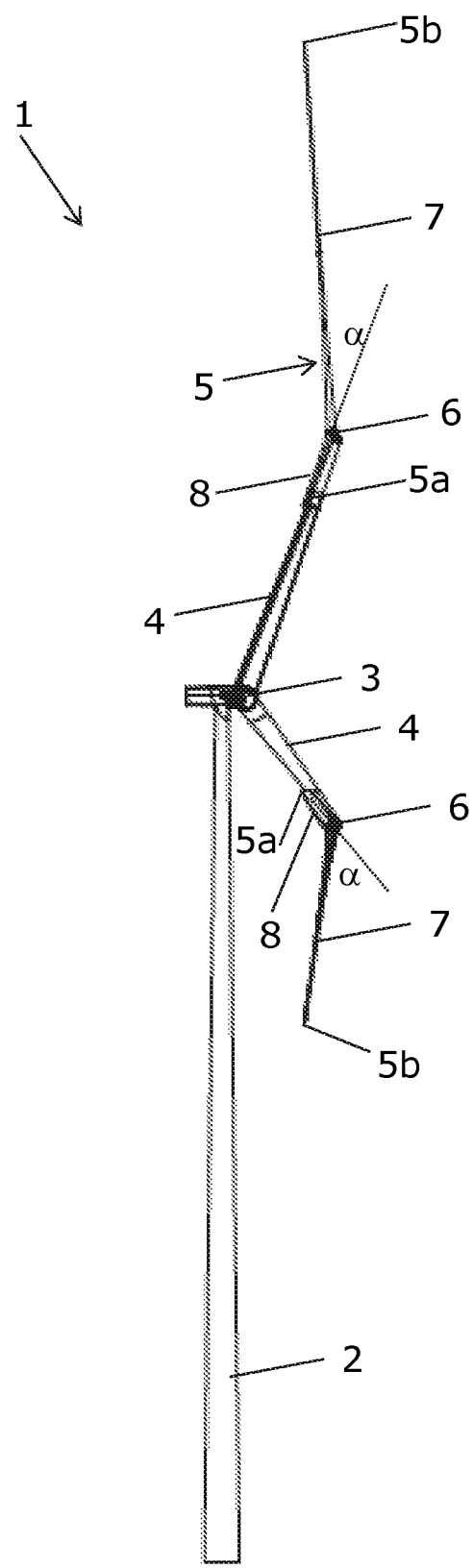
FIGS. 2-4 are side views of the wind turbine of FIG. 1 with the wind turbine blades at three different pivot angles.
Figure 3:
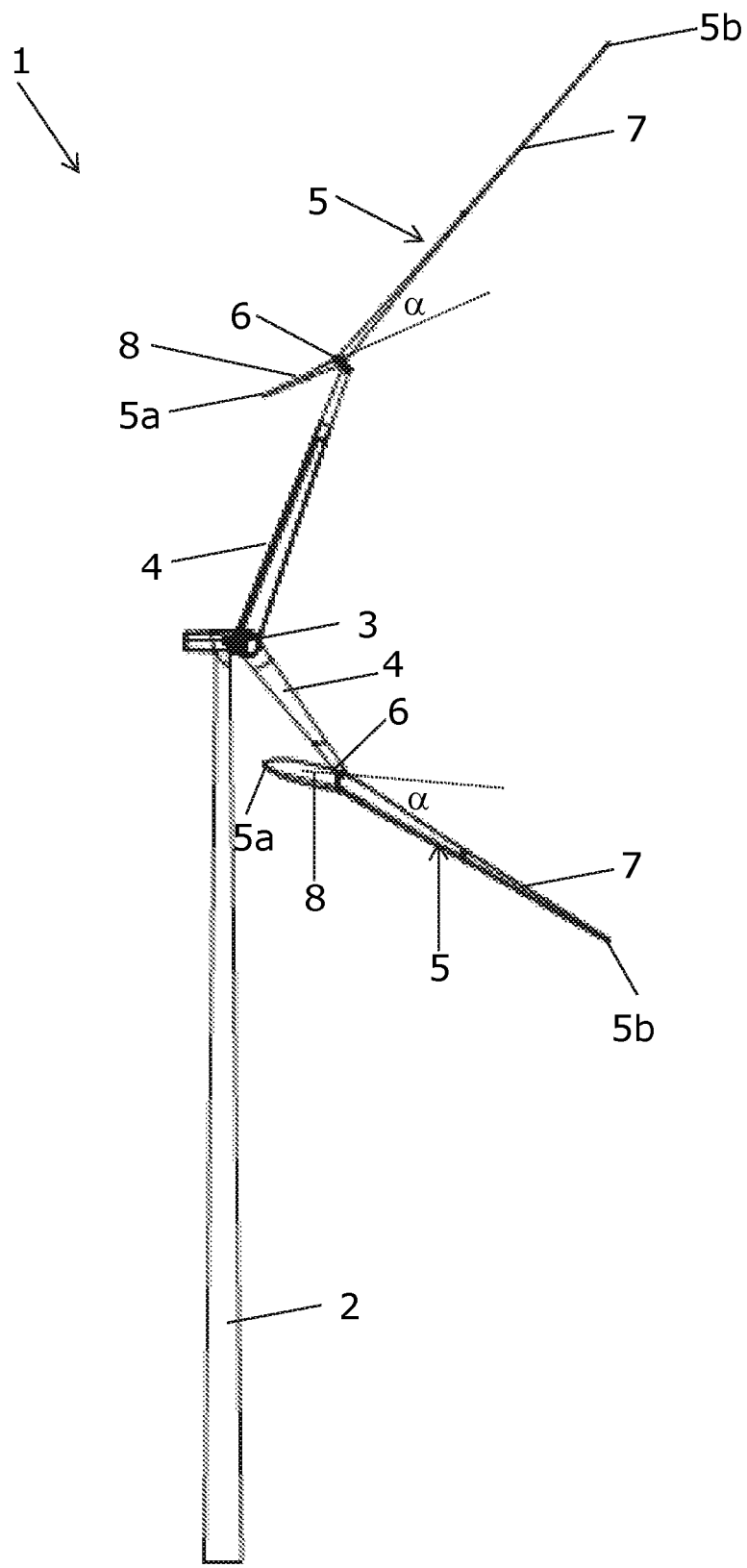
Figure 4:
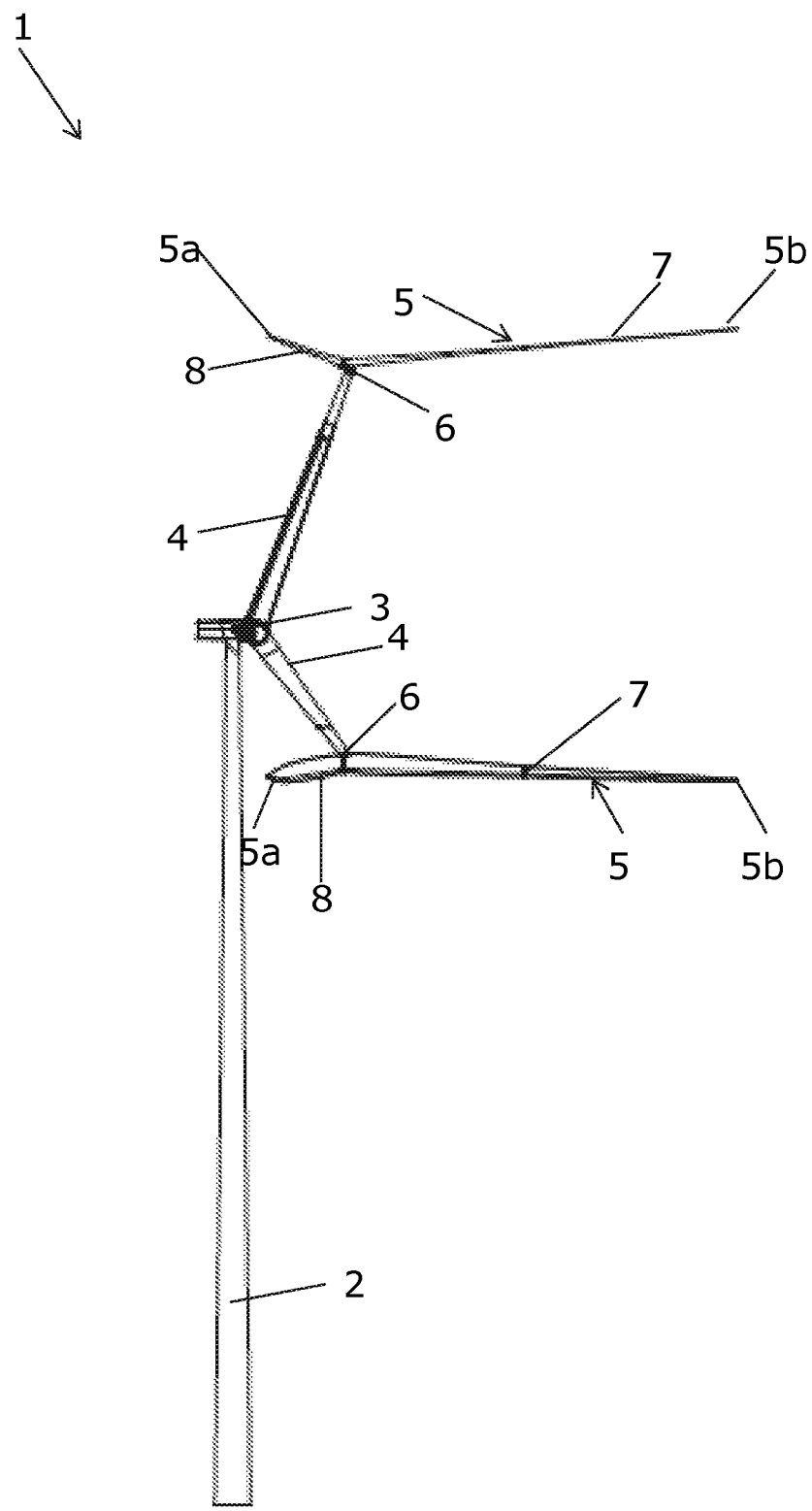

The outer blade part 7 extends from the hinge 6 along a first direction and the inner blade part 8 extends from the hinge 6 along a second direction. The first direction and the second direction form an angle, $\alpha$, there between. The wind turbine blade 5 thereby forms a bend at or near the hinge 6. In FIGS. 2-4 it can be seen that a is approximately 25°, and that it is in a flap-wise direction. It can further be seen that the bend is formed approximately at the position of the hinge 6.

FIGS. 2-4 are side views of the wind turbine 1 of FIG. 1 with the wind turbine blades 5 at three different pivot angles. The pivot angle can vary between a minimum pivot angle, defining a maximum rotor diameter, as shown in FIG. 2, and a maximum pivot angle, defining a minimum rotor diameter, as shown in FIG. 4. FIG. 3 shows the wind turbine blades 5 at an intermediate pivot angle between the maximum and minimum rotor diameter, i.e., minimum and maximum pivot angle.

In FIG. 2 the wind turbine blade 5 is arranged in a position defining minimum pivot angle, and thereby maximum rotor diameter. Accordingly, the inner blade part 8 is arranged immediately adjacent to the blade carrying structure 4. The bend defined by the angle, $\alpha$, between the inner blade part 8 and the outer blade part 7 ensures that the outer tip 5b, at this pivot angle, is arranged further away from the hub 3 along a radial direction than would be the case for a wind turbine blade without such a bend. This increases the maximum rotor area, and will be described in further detail below with reference to FIG. 5.

FIG. 3 shows the wind turbine 1 with the wind turbine blades 5 at a pivot angle between minimum and maximum pivot angle, and a rotor diameter which is decreased compared to the maximum rotor diameter illustrated in FIG. 2. It can be seen that the inner blade part 8 has moved away from the blade carrying structure 4, and that the inner tip 5a has been moved closer to the tower 2.

FIG. 4 shows the wind turbine 1 with the wind turbine blades 5 pivoted such that they define a maximum pivot angle and therefore minimum rotor diameter. Accordingly, the inner blade part 8 has been moved further away from the blade carrying structure 4 and the inner tip 5a has been moved closer to the tower 2.

The bend of the wind turbine blade 5, i.e., the angle, $\alpha$, ensures that the inner tip 5a is arranged further away from the tower 2 than would be the case if the wind turbine blade 5 had not been provided with the bend. Accordingly, the attachment point between the wind turbine blades 5 and the blade carrying structure 4 can be moved closer to the tower 2, without risking collisions between the wind turbine blades 5 and the tower 2 at large pivot angles. Thereby coning can be avoided, or a reduced coning angle can be applied. Thereby the centre of mass of the wind turbine blades 5 can be moved closer to the tower 2, thereby reducing the loads on the wind turbine 1, in particular on the hub 3, the drive train and the tower 2. Furthermore, this position of the centre of mass of the wind turbine blades 5 reduces inertia of the rotor when the wind turbine blades 5 are in a position defining minimum pivot angle, which will normally be the case at low wind speeds. This will be described in further detail below with reference to FIGS. 13 and 14.

Figure 5:
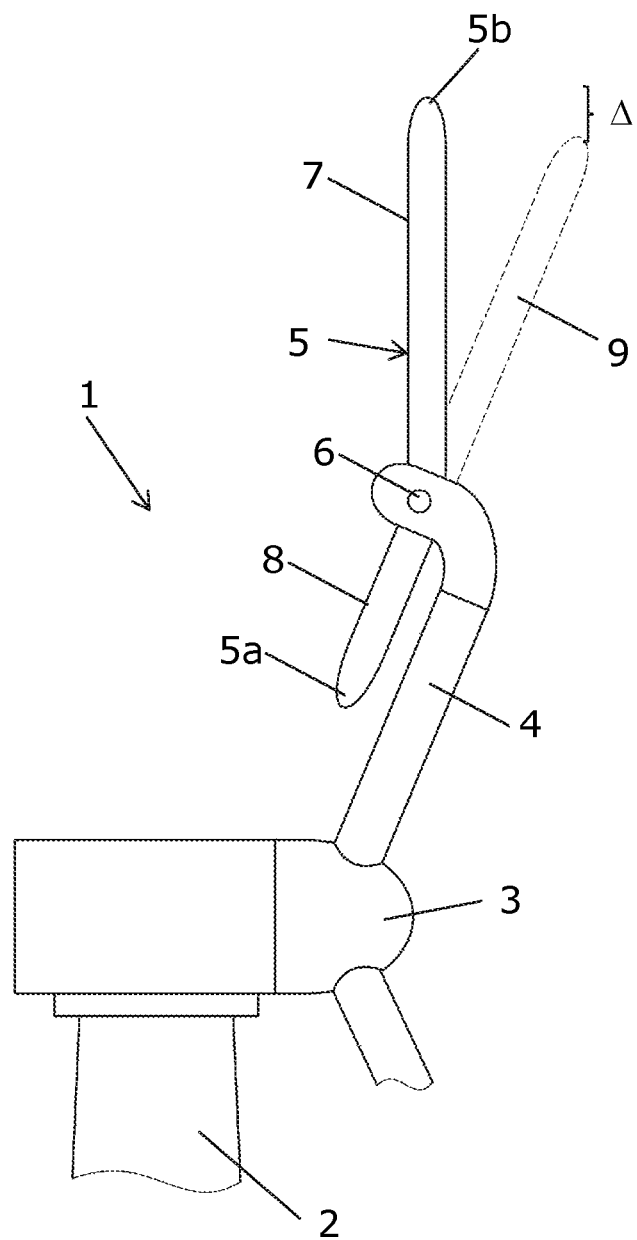
FIG. 5 shows part of the wind turbine shown in FIGS. 1-4, FIGS. 6 and 7 show an outer blade part of a wind turbine blade according to two different embodiments of the invention.

FIG. 5 shows part of the wind turbine shown in FIGS. 1-4. The dashed outline 9 represents an outer blade part with the same length as the outer blade part 7, but without the bend defining the angle, $\alpha$, which is described above with reference to FIGS. 1-4.

In FIG. 5 the wind turbine blade 5 is arranged at a position defining minimum pivot angle. It can be seen that the outer tip 5b, at this pivot angle, is arranged further away from the hub 3 by the distance, 4, than the outer tip of the dashed outline 9 representing the wind turbine blade without the bend. Accordingly, the bend provides an increased rotor diameter, and thereby increased power production, of the wind turbine 1 at the minimum pivot angle. This is desirable, since the minimum pivot angle often occurs at low wind speeds.

Figure 6:
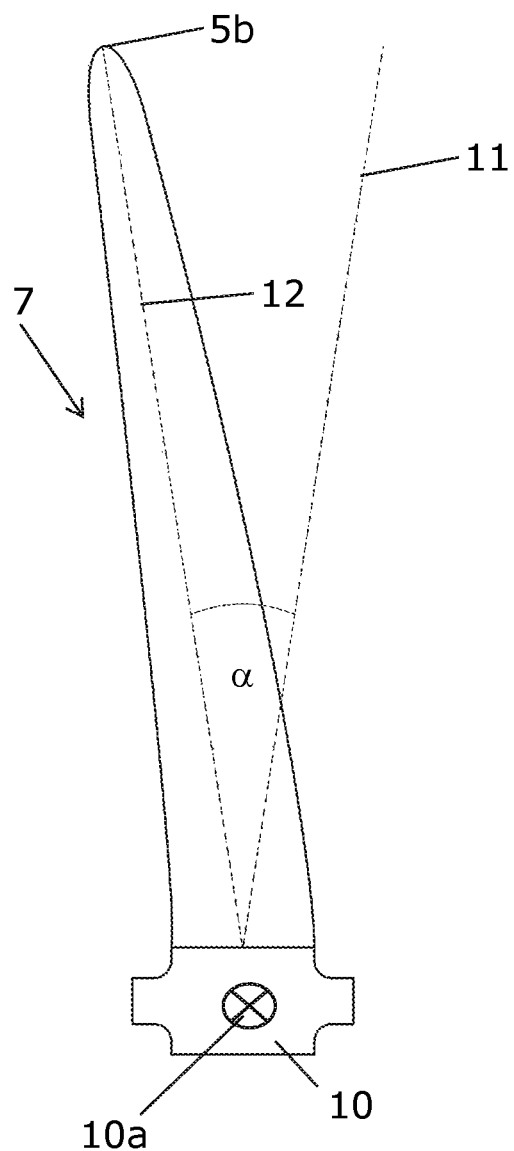
Figure 7:
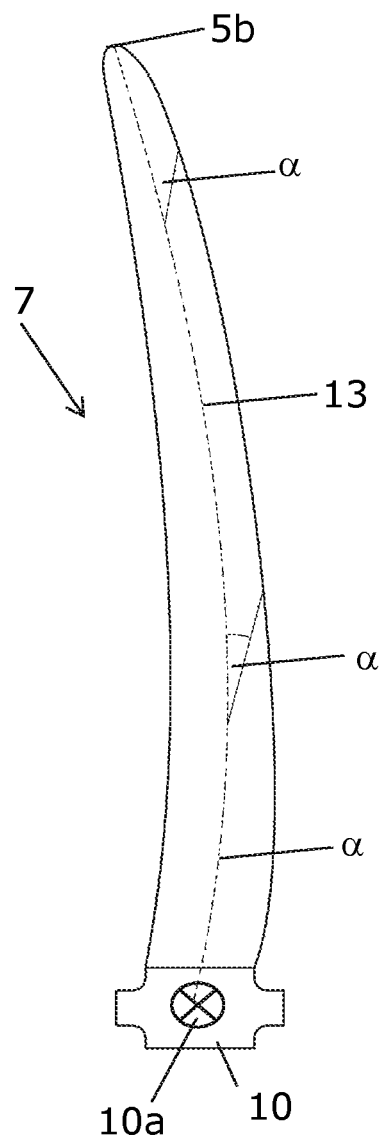

FIGS. 6 and 7 show outer blade parts 7 of a wind turbine blade according to two different embodiments of the invention. FIG. 6 shows an outer blade part 7 extending from a hinge part 10 defining a hinge region, along a straight line 12. The straight line 12 is non-perpendicular to a mounting surface of the hinge part 10, and it forms an angle, $\alpha$, with a direction 11, along which an inner blade part (not shown) attached to an opposite mounting surface of the hinge part 10 extends.

The hinge part 10 is provided with pins, one of which 10a is shown, for connecting the hinge part 10 to mating parts on a blade carrying structure, thereby forming a hinge.

FIG. 7 shows an outer blade part 7 which extends along a curved line 13 in the flap-wise direction. Accordingly, the angle, $\alpha$, between the outer blade part 7 and the inner blade part (not shown) increases along the outer blade part 7 in the direction towards the outer tip 5b.

Figure 8:
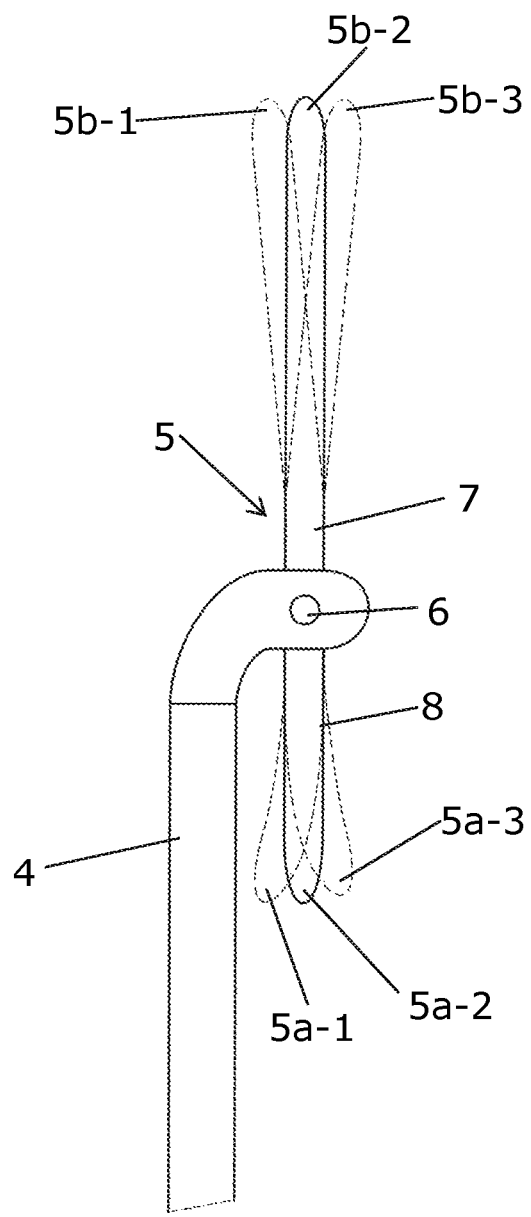
FIGS. 8 and 9 show possible bend directions of a wind turbine blade according to various embodiments of the invention.
Figure 9:
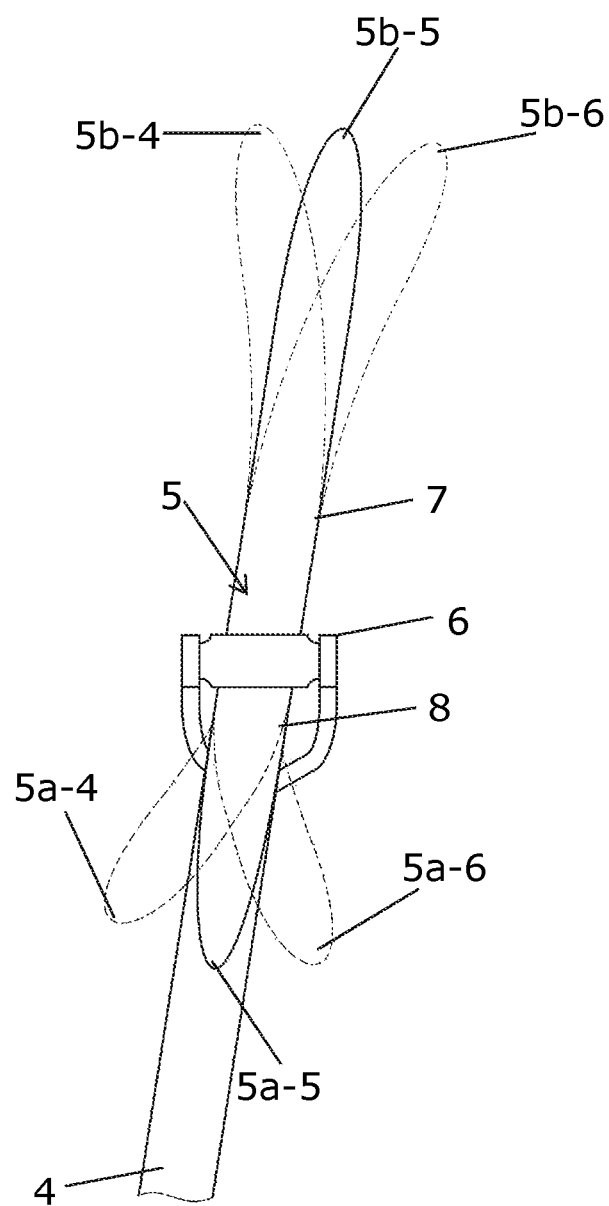

FIGS. 8 and 9 show possible bend directions of a wind turbine blade 5 according to various embodiments of the invention. FIG. 8 shows a side view of the wind turbine blade 5 hinged onto the blade carrying structure 4 via a hinge 6. FIG. 8 shows possible bending of the wind turbine blade 5 in the flap-wise direction. The inner blade part 8 may be curved in the flap-wise direction, either in an outwards direction relative to the blade carrying structure, having an inner tip 5a-3, or in an inwards direction relative to the blade carrying structure, having an inner tip 5a-1, or it may follow a straight line as indicated by inner tip 5a-2.

Similarly, the outer blade part 7 may be curved in the flap-wise direction, either in the outwards direction relative to the blade carrying structure, having an outer tip 5b-3, or in the inwards direction relative to the blade carrying structure, having an outer tip 5b-1, or it may follow a straight line as indicated by outer tip 5b-2. Any combinations of the inner tips 5a-1, 5a-2, 5a-3 and the outer tips 5b-1, 5b-2, 5b-3 could be applied.

FIG. 9 shows a front view of the wind turbine blade 5 and possible bending of the wind turbine blade 5 in an edge-wise direction. Bending in the edge-wise direction can be formed either as an alternative to the flap-wise bending illustrated in FIG. 8, or in addition to flap-wise bending.

According to this embodiment, the inner blade part 8 may be curved in the edge-wise direction, either towards the leading edge having an inner tip 5a-4, or in a direction towards the trailing edge having an inner tip 5a-6, or it may follow a straight line as indicated by inner tip 5a-5.

Similarly, the outer blade part 7 may be curved in the edge-wise direction, either towards the leading edge having an outer tip 5b-4, or in a direction towards the trailing edge having an outer tip 5b-6, or it could follow a straight line as indicated by outer tip 5b-5. Any combinations of the inner tips 5a-4, 5a-5, 5a-6 and the outer tips 5b-4, 5b-5, 5b-6 could be applied.

Curving a wind turbine blade 5 in the edge-wise direction is sometimes referred to as 'sweep'. When a wind turbine blade 5 provided with sweep passes the tower of a wind turbine, the tower is passed gradually, since the sweep ensures that only a portion of the wind turbine blade 5 is arranged adjacent to the tower at any given time. This reduces the loads on the wind turbine during tower passage, in particular loads on the wind turbine blade 5 and on the tower.

Figure 10:
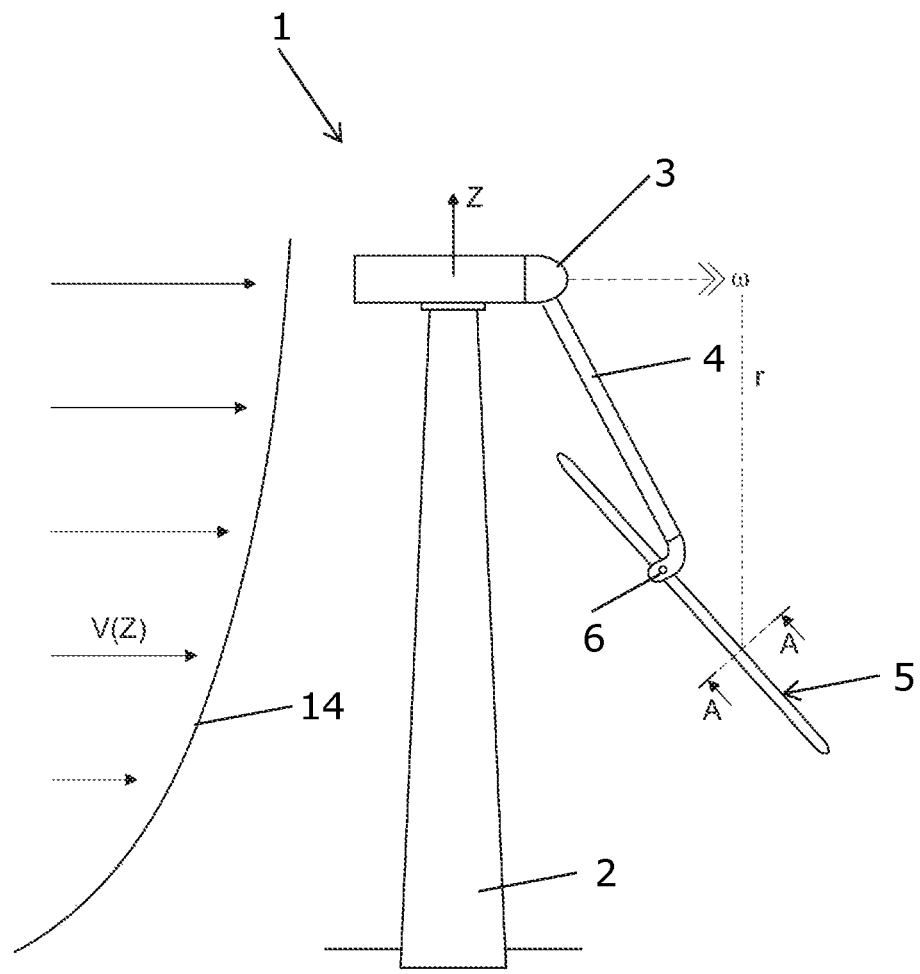
FIG. 10 shows a wind turbine exposed to vertical wind shear.

FIG. 10 shows a wind turbine 1 exposed to vertical wind shear 14, i.e. wind speed variations in a vertical direction z. In the situation illustrated in FIG. 10, the wind speed is low close to the base of the tower 2 and increases with increasing height and towards the hub 3. Such variations in wind speed at different heights create different loads on the wind turbine blades 5 as they rotate along with the hub 3. This causes deflections of the wind turbine blades 5 which vary periodically for each full turn of the rotor. This will normally lead to periodical variations in suction pressure on the wind turbine blades 5 and periodical variations in angle of attack.

Figure 11:
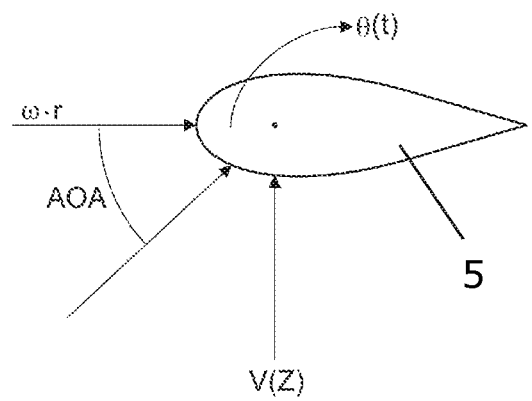
FIG. 11 is a cross-sectional view of a wind turbine blade according to an embodiment of the invention.

FIG. 11 is a cross-sectional view of a wind turbine blade 5 according to an embodiment of the invention, and a local angle of attack AOA on the wind turbine blade 5. The local angle of attack AOA in a cross section of the wind turbine blade 5 is defined as the angle between the chord of the wind turbine blade 5 and the relative wind speed, where the relative wind speed is the resultant vector of the local incoming wind speed vector V(z) and the local rotational speed vector ω·r of the wind turbine blade 5. During rotation V(z) changes as the blade 5 rotates, due to the wind shear, and thereby the angle of attack AOA changes.

The wind turbine blade 5 of FIG. 11 has a design which introduces bend/twist couplings of the wind turbine blade 5. This could, e.g., be provided by means of sweep, as described above with reference to FIG. 9, or by means of off-axis fibre placement. This has the consequence that increased deflections of the wind turbine blade 5 in the flap-wise direction causes torsional twist of the wind turbine blade 5 towards a lower angle of attack.

Figure 12:
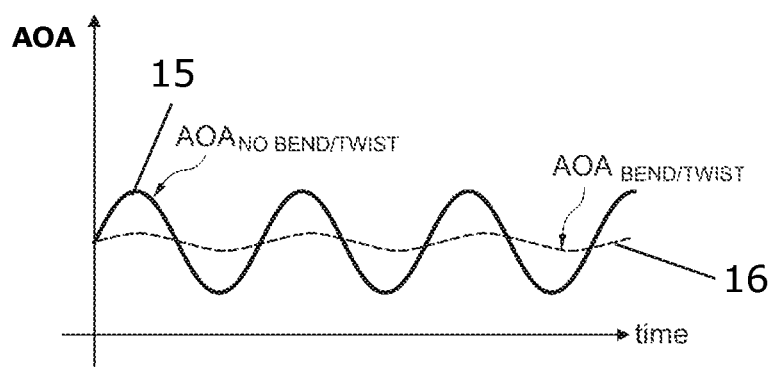
FIG. 12 is a graph showing angle of attack on the wind turbine blade of FIG. 11 as a function of time.

FIG. 12 is a graph showing angle of attack AOA as a function of time for a wind turbine blade without bend/twist couplings (solid line 15) and for the wind turbine blade of FIG. 11 (dashed line 16). It can be seen from curve 15 that for the wind turbine blade without bend/twist couplings, the angle of attack varies in a substantially sinusoidal manner as a function of time. For curve 16, representing the wind turbine blade of FIG. 11, the variations in angle of attack are significantly reduced. This is due to the bend/twist coupling described above. The reduced variations in angle of attack significantly reduce the loads on the wind turbine blade.

It should be noted that the remarks set forth above with reference to FIGS. 10-12 are equally applicable to a situation in which the wind turbine is subjected to wind weer, i.e. variations in wind speed along a horizontal direction, rather than along a vertical direction. Wind weer causes similar variations in deflection of the wind turbine blade during a full rotation of the rotor as wind shear, and therefore bend/twist couplings will reduce variations in angle of attack in the same manner as described above in this case.

Figure 13:
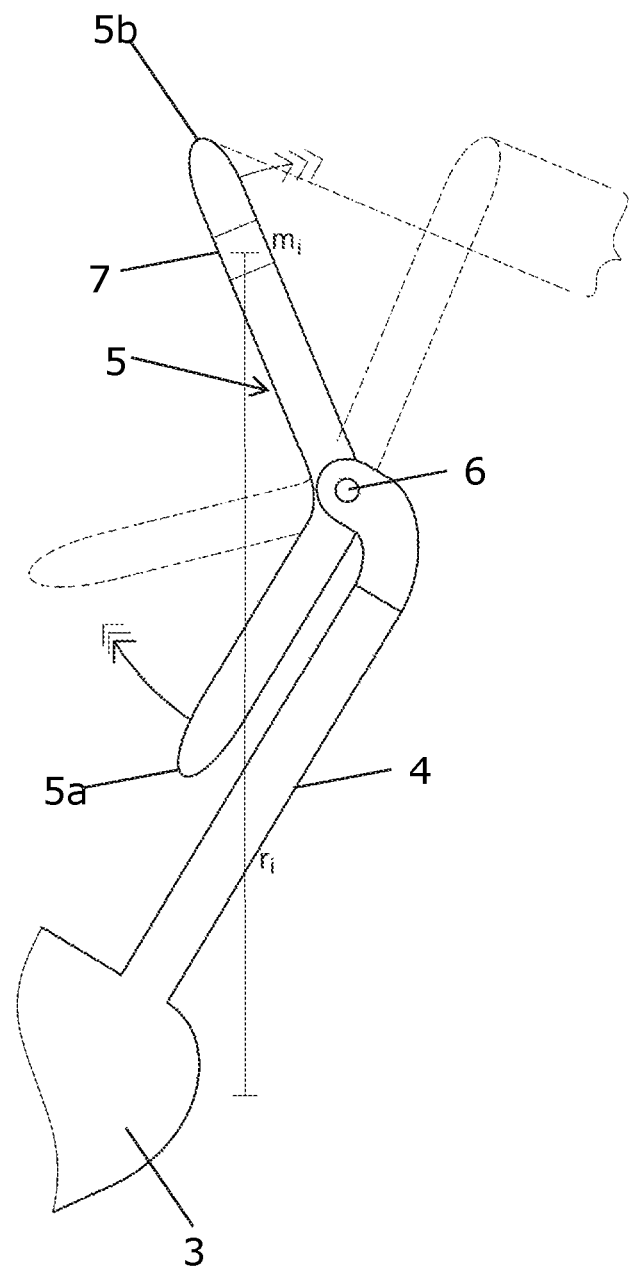
FIG. 13 shows a wind turbine blade according to an embodiment of the invention at two different pivot angles.

FIG. 13 shows a wind turbine blade 5 according to an embodiment of the invention at two different pivot angles. The wind turbine blade 5 is very similar to the wind turbine blades 5 illustrated in FIGS. 1-5, and it will therefore not be described in detail here. The solid line shows the wind turbine blade 5 at minimum pivot angle, and the dashed line shows the wind turbine blade 5 at a larger pivot angle.

The inertia of the wind turbine blade 5 can be calculated as:

$$\Sigma_i r_i^2 \cdot m_i,$$

where i indicates infinitesimal portions of the wind turbine blade 5, $r_i$ is the distance between the portion i and the rotational axis of the rotor, and $m_i$ is the mass of the portion i. One of these infinitesimal portions is shown in FIG. 13.

The bend of the wind turbine blade 5 arranges the centre of mass of the wind turbine blade 5 closer to the rotational axis of the rotor, when the wind turbine blade 5 is arranged at or near minimum pivot angle. Thereby the inertia of the wind turbine blade 5 is reduced, and can easily be overcome by wind acting on the wind turbine blades 5, and thereby it is easy to start the wind turbine 1 at cut-in wind speed.

Figure 14:
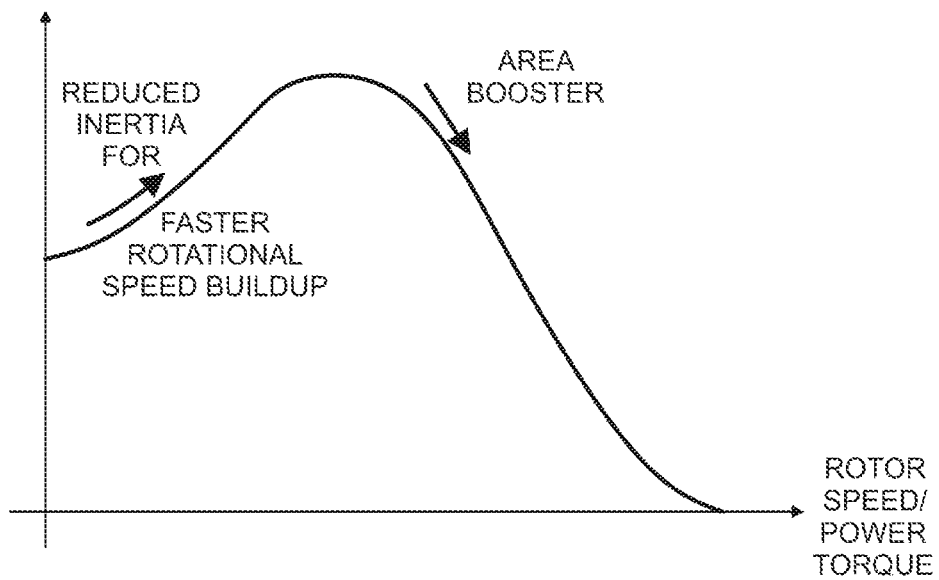
FIG. 14 shows rotor inertia as a function of rotor speed for a wind turbine according to an embodiment of the invention.

FIG. 14 is a graph showing rotor inertia of a wind turbine as a function of rotor speed. It can be seen that at low rotor speed the drivetrain losses are relatively high. During start-up of a wind turbine it is therefore desirable to increase the rotor speed to a level where the drivetrain losses decrease as fast as possible. The reduced inertia described above with reference to FIG. 13 ensures this.

Furthermore, the increased rotor diameter provided by the bend of the wind turbine blades ensure that the rotor speed is increased even faster once the region labelled 'Area booster' is reached.

Figure 15:
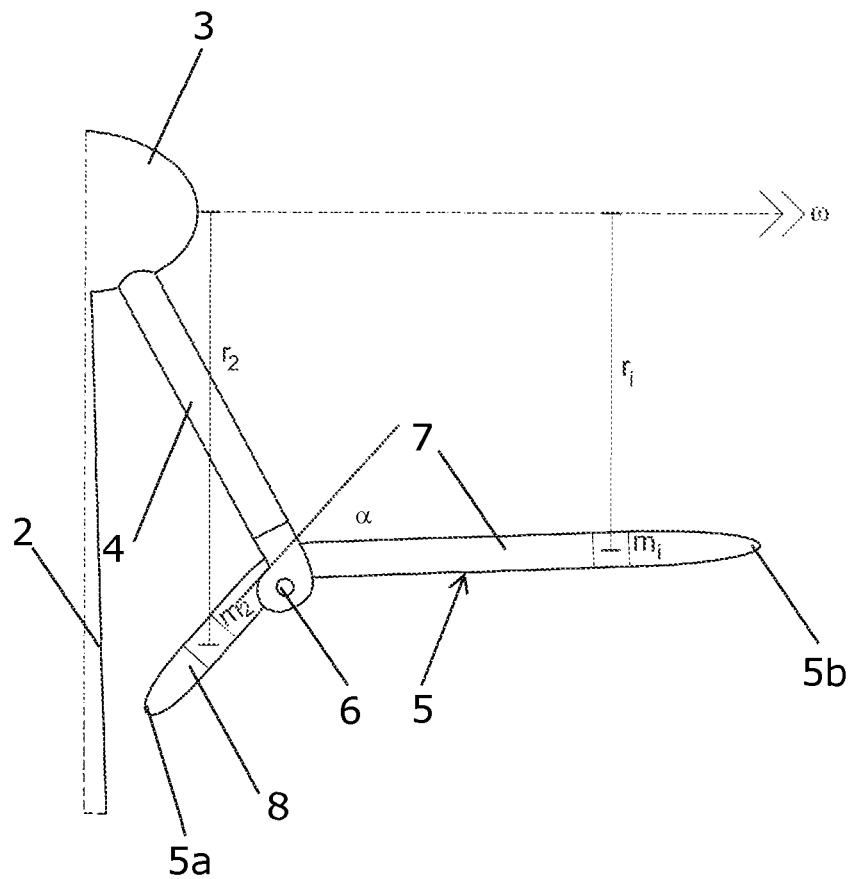
FIG. 15 shows a wind turbine blade according to an embodiment of the invention at maximum pivot angle.

FIG. 15 shows a wind turbine blade 5 according to an embodiment of the invention. The wind turbine blade 5 is arranged at a position defining maximum pivot angle. Thereby the outer blade part 7 is arranged substantially parallel to a rotational axis of the hub 3, while the inner blade part 8 is arranged with an angle thereto, due to the angle, α, between the inner blade part 8 and the outer blade part 7.

It can be seen that the angle, α, between the inner blade part 8 and the outer blade part 7 causes the inner tip 5a to be arranged further away from the tower 2 than would be the case if a wind turbine blade without a bend was used. Accordingly, due to the bend, the wind turbine blade 5 can be mounted on the blade carrying structure 4 at a position closer to the tower 2, and thereby the centre of mass for the hub 3, the blade carrying structure 4 and the wind turbine blades 5 can be moved closer to the tower 2, without risking collisions between the wind turbine blades 5 and the tower 2, and without having an increased coning angle. This reduces uneven loads on the wind turbine 1.

Furthermore, the centrifugal force acting on a given infinitesimal part of the wind turbine blade 5, can be calculated as:

$$r_i \cdot m_i \cdot \omega^2,$$

where $r_i$ is the distance between the infinitesimal part and the rotational axis of the hub 3, $m_i$ is the mass of the infinitesimal part and ω is the rotational speed of the hub.

Thus, for a given rotational speed, ω, the centrifugal force acting on the infinitesimal part of the wind turbine blade 5 is given by the distance, $r_i$, and the mass, $m_i$. It can be seen from FIG. 15 that the distance between the inner blade part 8 and the rotational axis of the hub 3 is larger than would be the case if a wind turbine blade without a bend was applied. This allows a given centrifugal force, and thereby a desired behaviour of the wind turbine blade 5, to be obtained with a lower mass of the inner blade part 8. This reduces the total mass of the wind turbine blade 5, and thereby the loads on the wind turbine 1 as well as manufacturing costs.

FIGS. 16a-16c illustrate a wind turbine blade 5 according to an embodiment of the invention at two different pivot angles, Ψ. Wind turbine blade 5 is shown at minimum pivot angle, and wind turbine blade 5' is shown at a larger pivot angle. FIG. 16a is a side view of the wind turbine blade 5, FIG. 16b is a front view of the wind turbine blade 5, and FIG. 16c is a cross sectional view along the line A-A shown in FIG. 16b.

In FIGS. 16a and 16b, a line 17 extending perpendicularly to the rotational axis 18 of the hub (not shown), and interconnecting the rotational axis 18 of the hub and the position of the hinge 6 is shown. It should be noted that the line 17 is shown for illustrative purposes, and is not a structural part of the wind turbine.

As best seen in FIG. 16b, the rotational axis 19 of the hinge 6 forms an angle, Φ, with respect to the line 17, which is slightly smaller than 90°. Thereby, when the pivot angle, Ψ, is increased, the wind turbine blade 5 is also rotated about its torsional axis. This is illustrated in FIG. 16c, where the wind turbine blade 5' is rotated about its torsional axis relative to the wind turbine blade 5.

As illustrated in FIG. 16c, this affects the angle of attack, δ, in such a manner that, given that the relation between the rotational speed, ω, of the rotor and the wind speed, $v_{wind}$, is fixed, the angle of attack, δ, of the wind turbine blade 5 can be controlled for any wind speed. In the case that Φ<90°, a close to constant angle of attack, δ, can be maintained passively throughout the wind speeds where the wind turbine produces power, by adjusting the pivot angle, Ψ, as illustrated in FIG. 16c. Alternatively, in the case that Φ>90°, it is possible to passively control at which wind speed the blade will stall, hence pushing it towards maximum pivot angle.

Additionally, at hinge angles Φ≠90°, the torsional movement of the blade carrying structure 4 will not be directly coupled to the edge-wise movement of the wind turbine blade 5. This introduces a considerable amount of damping of the torsional movements in the blade carrying structure 4 from the partly edge/flap coupled blade movements.

Additionally, at hinge angles Φ≠90°, the hinge 6 has a direct impact on blade direction of movement during blade vibrations. As the aeroelastic damping is sensitive to this direction of vibration relative to the incoming wind, the damping can be adjusted by the skew hinge angle and therefore be an efficient method to eliminate risk of, e.g., edgewise blade vibrations.

The invention claimed is:

1. A horizontal axis wind turbine comprising a tower, a nacelle mounted on the tower via a yaw system, a hub mounted rotatably on the nacelle, the hub comprising a blade carrying structure, and at least one wind turbine blade defining an aerodynamic profile between an inner tip and an outer tip, the wind turbine blade comprising:

a hinge connecting the wind turbine blade to the blade carrying structure, in a hinge region of the wind turbine blade, the hinge region being arranged at a non-zero distance from the inner tip and at a non-zero distance from the outer tip, the wind turbine blade thereby being arranged to perform pivot movements relative to the blade carrying structure between a minimum pivot angle and a maximum pivot angle, an outer blade part arranged between the hinge region and the outer tip, and an inner blade part arranged between the hinge region and the inner tip, wherein the outer blade part extends from the hinge region along a first direction and the inner blade part extends from the hinge region along a second direction, and wherein the first direction and the second direction form an angle, α, there between, where 0°<α<90°, wherein the inner tip of the wind turbine blade is free of mechanical connections that cause the pivot movement towards the maximum pivot angle of the wind turbine blade relative to the blade carrying structure.

2. The horizontal axis wind turbine according to claim 1, wherein the angle, α, is in a flap-wise direction.

3. The horizontal axis wind turbine according to claim 1, wherein the outer blade part and the inner blade part are two separate parts being joined to each other.

4. The horizontal axis wind turbine according to claim 3, wherein the wind turbine blade further comprises a hinge part interconnecting the inner blade part and the outer blade part.

5. The horizontal axis wind turbine according to claim 1, wherein the outer blade part and the inner blade part form one piece.

6. The horizontal axis wind turbine according to claim 1, wherein the angle, α, is within a range of 5° to 45°.

7. The horizontal axis wind turbine according to claim 1, wherein the inner blade part and/or the outer blade part are curved in a flap-wise direction.

8. The horizontal axis wind turbine according to claim 1, wherein the inner blade part and/or the outer blade part are curved in an edge-wise direction.

9. The horizontal axis wind turbine according to claim 1, wherein the wind turbine blade comprises a plurality of fibres arranged in parallel along the wind turbine blade, and wherein the wind turbine blade comprises a region in which an orientation of the fibres deviates from a main orientation of the fibres being substantially parallel to a leading edge or a trailing edge of the wind turbine blade.

10. The horizontal axis wind turbine according to claim 1, wherein the inner blade part is provided with a balancing mass.

11. The horizontal axis wind turbine according to claim 1, wherein the inner blade part and/or the outer blade part is provided with a winglet.

12. The horizontal axis wind turbine according to claim 1, further comprising a biasing mechanism arranged to apply a biasing force to the wind turbine blade which biases the wind turbine blade towards a position defining a minimum pivot angle relative to the blade carrying structure.

13. The horizontal axis wind turbine according to claim 1, further comprising a biasing mechanism arranged to apply a biasing force to the wind turbine blade which biases the wind turbine blade towards a position defining a maximum pivot angle relative to the blade carrying structure.

14. The horizontal axis wind turbine according to claim 1, wherein the blade carrying structure comprises one or more arms, each arm having a wind turbine blade connected thereto.

15. The horizontal axis wind turbine according to claim 14, wherein each arm extends from the hub along a direction which forms an angle, $\beta$, relative to a vertical direction, where $0°<\beta<30°$.

16. The horizontal axis wind turbine according to claim 1, wherein a rotational axis of the hinge of each wind turbine blade is arranged relative to a line which extends between a rotational axis of the hub and a centre of the hinge, in such a manner that the rotational axis of the hinge and the line form an angle, $\Phi$, there between which differs from 90°.

\* \* \* \* \*